United States Patent

[11] 3,558,863

[72] Inventors Roy M. Williams, Jr.;
John R. Longland, Nashua, N.H.
[21] Appl. No. 811,092
[22] Filed Mar. 27, 1969
[45] Patented Jan. 26, 1971
[73] Assignee Sanders Associates, Inc.
Nashua, N.H.
a corporation of Delaware

[54] COORDINATE CONVERTER USING MULTIPLYING DIGITAL-TO-ANALOG CONVERTERS
6 Claims, 6 Drawing Figs.

[52] U.S. Cl. .................................................. 235/150.52,
340/347; 235/189
[51] Int. Cl. ....................................................... G06j 1/00,
G06g 7/22
[50] Field of Search ........................................... 235/186,
189, 190, 191, 192, 197, 150.53; 340/347A—D,
D—A

[56] References Cited
UNITED STATES PATENTS
2,966,302 12/1960 Woolf et al. ................... 235/150.52
3,065,423 11/1962 Peterson ........................ 235/150.52
3,088,104 4/1963 Lord ............................. 340/347(D-A)
3,305,857 2/1967 Barber ......................... 340/347(D—A)
3,309,508 3/1967 Witt ............................. 235/150.52
3,403,393 9/1968 Skrenes ....................... 340/347(D—A)
3,430,855 3/1969 Hartwell et al. .............. 235/150.53X
3,457,394 7/1969 Grado ......................... 235/186X Primary Examiner—Malcolm A. Morrison
Assistant Examiner—Joseph F. Ruggiero
Attorney—Louis Etlinger ABSTRACT: A coordinate converter used in a display system for generating deflection voltages capable of rotating and/or translating one or more images on the screen of a cathode ray tube is described. More particularly, the converter uses four multiplying digital to analogue converters each of which combines one analogue voltage representing one of the initial coordinates, $x$ or $y$, with one binary digital input in two's complement form which represents either the sine or the cosine of the rotation angle. The outputs of these converters are combined to solve the coordinate rotation equations. Incremental voltages representing the desired translation may be added before and/or after the rotation computation.

$$x_{cc} = x \cos \theta - y \sin \theta$$
$$y_{cc} = x \sin \theta + y \cos \theta$$

INVENTORS
ROY M. WILLIAMS JR.
JOHN R. LONGLAND

ATTORNEY

INVENTORS
ROY M. WILLIAMS JR.
JOHN R. LONGLAND

ATTORNEY

COORDINATE CONVERTER USING MULTIPLYING DIGITAL-TO-ANALOG CONVERTERS

BACKGROUND OF THE INVENTION

1. Field of the Invention

This invention relates generally to display systems which exhibit various patterns including images and characters on a viewing screen such as the face of a cathode ray tube. The invention relates more particularly to apparatus which enables one or more or all of the images or characters to be translated and/or rotated to a new position and/or orientation on the viewing screen.

One common type of display apparatus, with which the present invention is particularly useful, is one in which various characters, symbols and images, such as numbers, letters, circles, and/or pictorial images such as those from television or radar equipment, may be displayed at any position or orientation on a viewing screen in response to commands from a computer or other directing device. Such characters and images may be formed one at a time by moving a cursor over the appropriate part of the screen to trace the character or image. When one character is completed, the cursor is blanked out, moved to the next location, turned on, and moved to trace out the next character. The programs of deflection voltages for forming frequently used characters may be sorted in an appropriate memory. The viewing screen normally has a short persistence and the entire display is refreshed by retracing each character and image frequently, for example, 60 times per second.

Display apparatus as generally described above is used for many different purposes in many different environments. It has been found desirable in many cases to be able to alter the view presented by changing the position or orientation, or both, of the entire presentation or any selected part thereof. For example, it may be desired to move one character from the upper right to the lower left, in which case translation is required. As another example, it may be desired to rotate the entire display about the center, in which case coordinate rotation is required. Additionally, it is often useful to be able to both rotate and translate one or more selected characters in which case coordinate rotation and translation are both required.

2. Description of the Prior Art

In the past, coordinate translation and rotation has been obtained in various ways. For example, the waveforms for generating characters in several orientations can be stored, but this uses valuable memory space. As another example, the deflection coils of a cathode ray tube may be mechanically rotated, but this is cumbersome at best. Also, various combinations of coordinate translators and rotators have been proposed, but, as far as applicants are aware, none has been entirely satisfactory.

It is a general object of the present invention to provide an improved coordinate converter for use with display apparatus.

Another object is to provide a coordinate converter which enables an image to be translated or rotated or both.

Another object is to provide a coordinate converter which enables an image to be translated either before or after being rotated.

Another object is to provide a coordinate converter enabling the image to be rotated through a full 360° or any part thereof.

SUMMARY OF THE INVENTION

Briefly stated, the coordinate rotation portion of the converter accepts two analogue signals representing the instantaneous $x$ and $y$ coordinates of a point. It also accepts two digital signals, in two's complement form, representing the sine and cosine of the angle of rotation. Four multiplying digital to analogue converters are provided in which both $x$ and $y$ are multiplied by both the sine and the cosine of the angle. The result, depending upon the quadrant of the angle, may represent $x$ or $y$ multiplied by the absolute value of the trigonometric function or may represent $x$ or $y$ multiplied by one minus the absolute value of the function. Additionally, each multiplying digital to analogue converter generates a signal according to the sign of the function, zero if the sign is positive, and the negative of $x$ or $y$, as the case may be, if the sign of the function is negative. The signals generated by the multiplying digital to analogue converters are combined to derive two signals representing the instantaneous coordinates of the point as rotated through the given angle.

Analogue signals indicative of the incremental values of $x$ and $y$ for translation may be added to the $x$ and $y$ signals either before or after modification by the coordinate rotator.

BRIEF DESCRIPTION OF THE DRAWING

For a clearer understanding of the invention, reference may be made to the following detailed description and the accompanying drawing, in which.

DESCRIPTION OF PREFERRED EMBODIMENT

Figure 1:
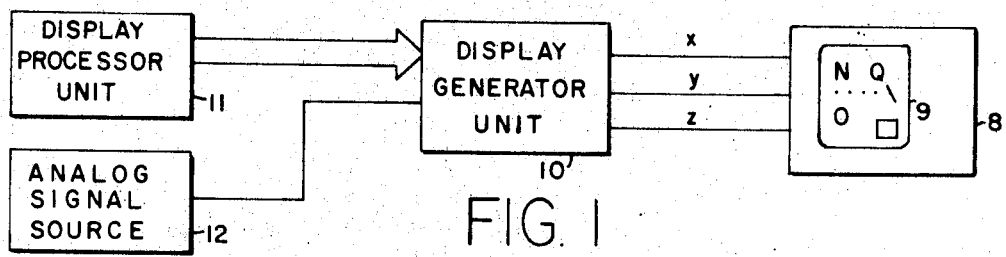
FIG. 1 is a schematic block diagram of a display system; connections

Referring first to FIG. 1, there is shown a Display Indicator Unit 8 including the viewing screen 9 of a cathode ray tube on which are displayed various characters, symbols, pictures, and the like. The Unit 8 may be but one of many similar or identical devices, all of which may be controlled by the same Display Generator Unit 10. Display Processor Unit 11, and Analogue Signal Source 12. The source 12 represents schematically a source of signals which are primarily pictorial in nature, such as those from a radar installation or a television camera. These signals, analogue in form, are applied to the unit 10 so that they may be displayed if desired. The Display Processor Unit 11 may be, and preferably is, a digital computer including equipment for receiving, storing, selecting and processing information regarding the time and location on the screen at which various characters, symbols, etc. are to be displayed. Suitable signals indicative of this information are applied to the display generator unit 10 which responds thereto and, generally speaking, generates, and applies to the unit 8, analogue signals indicative of the instantaneous coordinates $x$ and $y$ and intensity $z$. The unit 10 of necessity includes considerable equipment, some of which is of particular interest for present purposes and is shown in FIG. 2.

Figure 2:
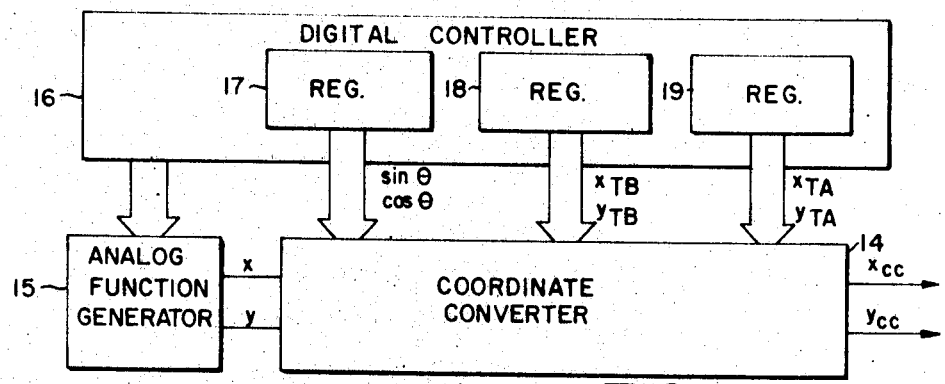
FIG. 2 is a schematic block diagram of the coordinate converter and its connections to the remainder of the display system.

Referring now to FIG. 2, there is shown the coordinate converter 14 of the present invention, a group of analogue function generators 15, and a digital controller 16 including several registers 17, 18 and 19. Among other things, the digital controller 16 applies suitable digital signals to the function generators 15 to enable them to generate analogue voltages indicative of the instantaneous values of the coordinates $x$ and $y$. The digital controller 16 also generates signals indicative of (1) whether and by how much the instantaneous coordinates are to be rotated. These signals operate in conjunction with the register 17 to generate two signals indicative of the instantaneous values of the sine and cosine respectively of the angle through which the coordinates are to be rotated. Each signal is in the well-known parallel binary digital two's complement form in which the most significant digit represents the sign of the function, zero for positive and one for negative, while the remainder of the digits represent the absolute value of the function, if positive, and the absolute value of the complement, if negative. The digital controller 16 also generates signals indicative of (2) whether and by how much the coordinates are to be translated before rotation and (3) whether and by how much the coordinates are to be translated after rotation. These latter two groups of signals operate in conjunction with the register 18 and 19 respectively to generate digital signals indicative of the instantaneous values of the increments to be added, before and after rotation respectively, to the $x$ and $y$ coordinates to translate the display of the point to its new location. The signals from the register 17, 18 and 19 are applied to the coordinate converter 14. The converter 14 combines its various inputs in a manner to be fully explained and generates two analogue output voltages indicative of the instantaneous coordinates of the point after the various rotations and translations, if any, have been performed.

Figure 3:
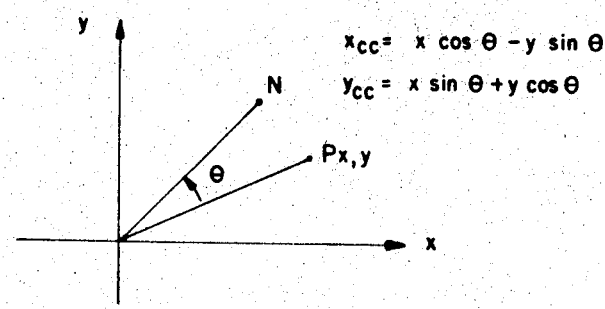
FIG. 3 is a schematic diagram useful in explaining the invention.

Referring now to FIG. 3, there is shown schematically any point P in a plane having coordinates $x$, $y$. Let us assume that the point P is rotated about the origin through an angle $\theta$. Its new position will be a point N. It can be shown by simple straightforward mathematics which need not be detailed here that the coordinates $x_{cc}$, $y_{cc}$ of the point N in terms of $X$, $y$ and $\theta$ are $$x_{cc} = x \cos \theta - y \sin \theta \quad (1)$$

$$y_{cc} = x \sin \theta + y \cos \theta \quad (2)$$

These equations are used in the coordinate converter 14.

Figure 4:
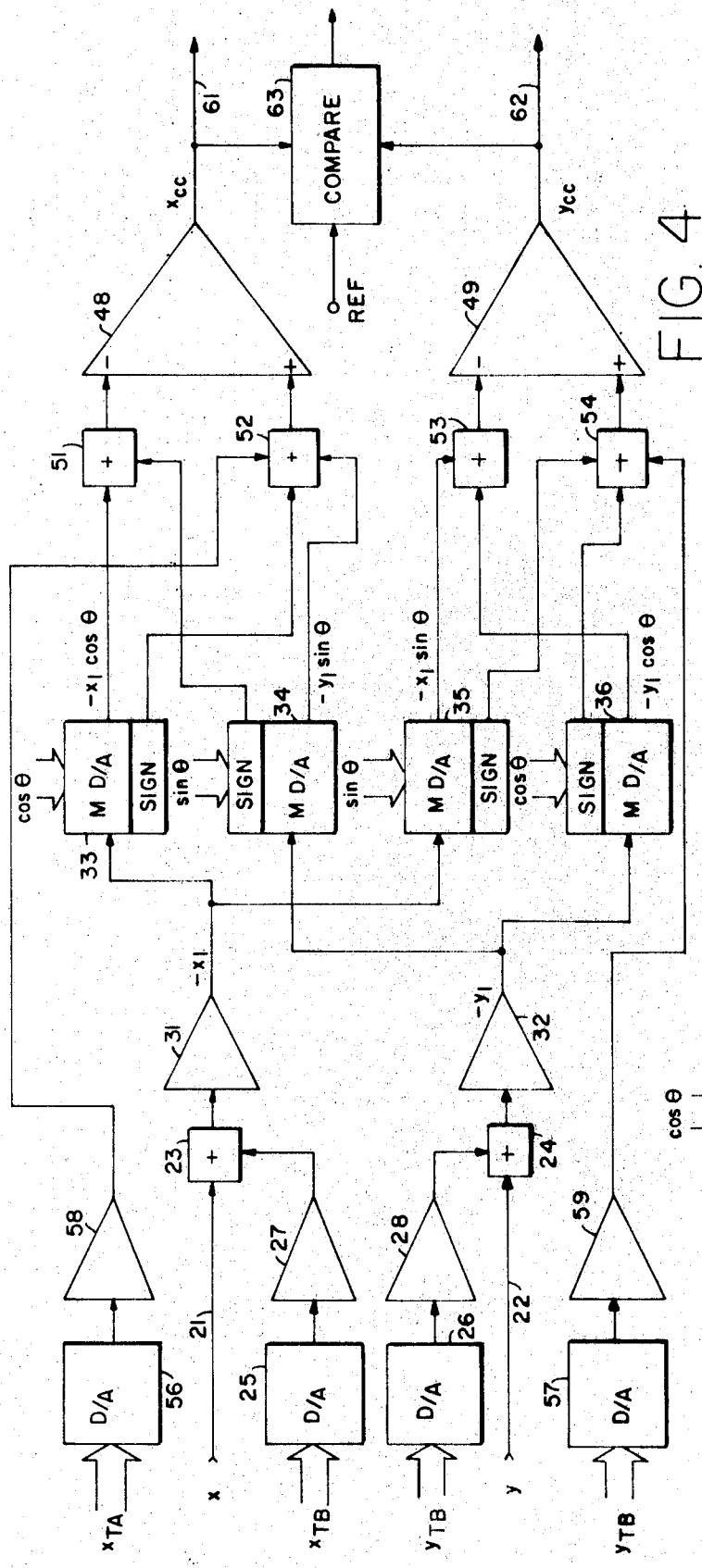
FIG. 4 is a schematic block diagram of the coordinate converter.

Referring now to FIG. 4, two unidirectional voltages, representing by their amplitude and sign the magnitude and sign of the instantaneous coordinates of a point, are received on conductors 21 and 22 respectively and applied to adding circuits 23 and 24 respectively. Two digital inputs representing the increments to be added to the $x$ and $y$ coordinates to effect translation before rotation are applied to digital to analogue converters 25 and 26 respectively, the analogue outputs of which are passed through isolating amplifiers 27 and 28 respectively and applied to adding circuits 23 and 24 respectively. The outputs of the latter circuits are applied to isolating and polarity reversing amplifiers 31 and 32 respectively to obtain voltages indicative of the negative of the $x$ and $y$ coordinates as modified by the aforesaid translational increments, which voltages are designated $-x_1$ and $-y_1$ respectively. Four multiplying digital to analogue converters 33, 34, 35 and 36 are provided. The $-x_1$ voltage from the amplifier 31 is applied to the converters 33 and 35 while the $-y_1$ voltage from the amplifier 32 is applied to the converters 34 and 36. The aforementioned digital signal from the digital controller 16 indicative of $\cos \theta$ is applied to the converters 33 and 36 while the similar signal indicative of $\sin \theta$ is applied to the converters 34 and 35.

Figure 5:
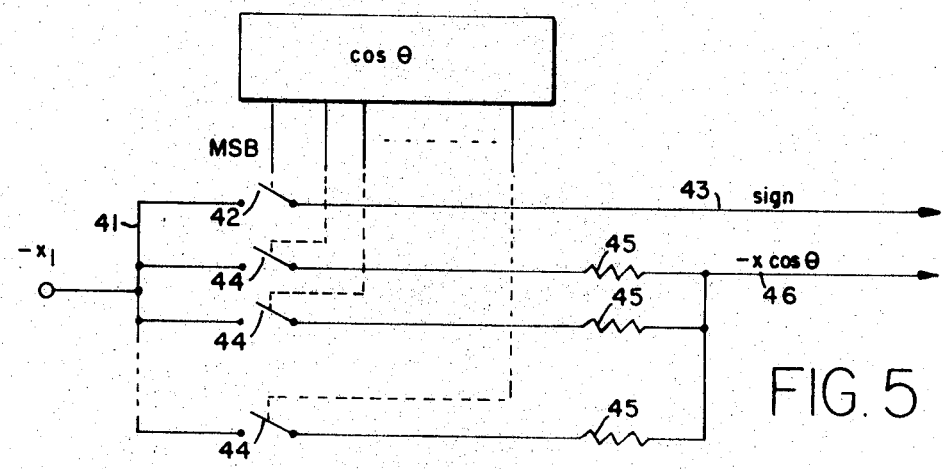
FIG. 5 is a schematic diagram of one of the multiplying digital to analogue converters.

Referring now to FIG. 5, which shows the converter 33 schematically, the $-x_1$ voltage is applied to an input conductor 41 to which are connected a plurality of switches, one for each bit in the input representing cosine $\theta$. One switch designated 42, is connected to an output conductor 43, designated the sign output conductor, and is operated by the most significant bit of the cosine $\theta$ representation, that is, by the sign bit, and is opened when this bit is zero and closed when this bit is one. Therefore, when the sign of cosine $\theta$ is positive, the voltage of conductor 43 is zero while when the sign of cosine $\theta$ is negative, the voltage of conductor 43 is indicative of $-x_1$. Each of the other switches, designated collectively by the reference character 44, is operated by a separate one of the remaining bits of cosine $\theta$ and each is connected through its individual resistor 45 to an output conductor 46, designated the product output conductor. The ohmic value of each of the resistors is selected in accordance with well-known principles so that the voltage of the conductor 46 is indicative of the product of $-x1$ and the absolute value represented by the bits of cosine $\theta$ other than the most significant bit. Although the switches 43 and 44 have been illustrated as if they were mechanical switches, as indeed they may be, it is preferred at present that they be fast acting switches such as diode, transistor, or other solid state switches.

Referring again to FIG. 4, the converters 34, 35 and 36 are identical to the converter 33 described in connection with FIG. 5. The outputs of converters 33 and 34 are combined to obtain an output indicative of $x_{cc}$ while the outputs of converters 35 and 36 are combined to obtain an output indicative of $y_{cc}$. More particularly, amplifiers 48 and 49 are provided, each having first and second inputs designated plus and minus respectively. A voltage applied to the minus input is reversed in polarity and added to that applied to the plus input. The product output of the converter 33 is combined in an adding circuit 51 with the sign output of the converter 34 and applied to the minus input of the amplifier 48. The product output of the converter 34 is combined in an adding circuit 52 with the sign output of the converter 33 and applied to the plus input of the amplifier 48. The product output of the converter 35 is combined in an adding circuit 53 with the product output of the converter 36 and applied to the minus input of the amplifier 49. The sign output of the converter 35 is combined in an adding circuit 54 with the sign output of the converter 36 and applied to the plus input of the amplifier 49. Additionally, digital inputs from the controller 16 representing the increments to be added to the $x$ and $y$ coordinates to effect translation after rotation are applied to digital to analogue converters 56 and 57 respectively, the analogue outputs of which are passed through isolating amplifier 58 and 59 respectively and applied to the adding circuits 52 and 54 respectively. It will be understood that the adding circuits 51—54 and the amplifiers 48 and 49 represent but one way, albeit that preferred at present, for combining the various voltages with the proper polarity.

Let it be assumed for the moment that there are no translational increments to be added and that the rotational angle $\theta$ is in the first quadrant so that both the sine and the cosine are positive. Then the sign outputs of all of the converters 33, 34, 35 and 36 are zero while the product outputs are voltages indicative of $-x_1 \cos \theta$, $-y_1 \sin \theta$, $-x_1 \sin \theta$ and $-y_1 \cos \theta$ respectively. The combination in amplifier 48 of $-x_1 \cos \theta$ with polarity reversal and $-y_1 \sin \theta$ without polarity reversal yields an output voltage indicative of $x_{cc}$ as defined by equation (1). Similarly, the combination in amplifier 49 of $-x_1 \sin \theta$ and $-y_1 \cos \theta$ both with polarity reversal, yields as output voltage indicative of $y_{cc}$ as defined by equation 2.

Figure 6:
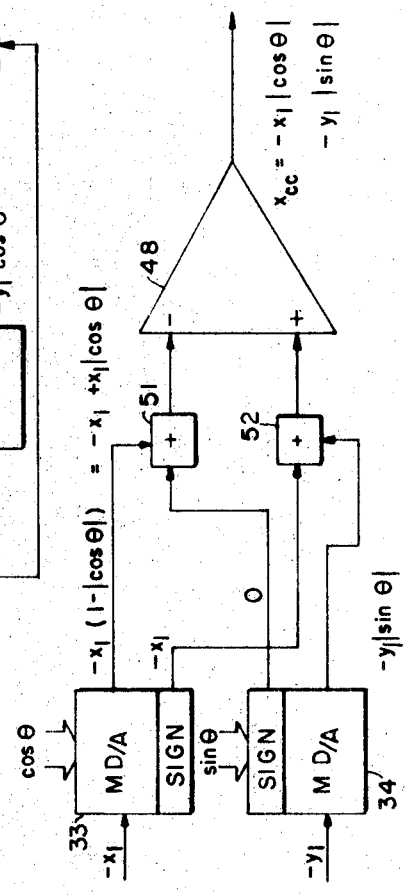
FIG. 6 is a view of a portion of the apparatus of FIG. 4 with explanatory matter added which is useful in explaining the invention.

Let it next be assumed that the rotational angle $\theta$ is in the second quadrant so that sin $\theta$ is positive while cos $\theta$ is negative. As shown in FIG. 6, the sign output of converter 33 is a voltage indicative of $-x_1$ and is applied through the adding circuit 52 to the plus input of the amplifier 48. The sign output of converter 34 is zero. The product output of converter 33 is a voltage indicative of $-x_1$ $(1- |\cos \theta| \;)$ and is applied through the adding circuit 51 to the minus input of the amplifier 48. The product output of the converter 34 is a voltage indicative of $-y_1$ $|\sin \theta|$ and is applied through the adding circuit 52 to the plus input of the amplifier 48. The sum of $-x_1$ without polarity reversal, $-x_1 + x_1 |\cos \theta|$ with polarity reversal, and $-y_1 |\sin \theta|$ without polarity reversal yields a voltage indicative of $$x_{cc} = -x_1|\cos \theta| - y_1|\sin \theta| \quad (3)$$

Equation (3) is seen to be identical to equation (1) when it is remembered that in the second quadrant cos $\theta$ is negative and sin $\theta$ is positive.

A similar analysis as to $x$ and $y$ for the remaining quadrants shows that the circuit of FIG. 4 yields correct results in all cases.

Referring again to FIG. 4, the output indicative of $x_cc$ and $y_cc$ appearing on conductors 61 and 62 respectively are voltages suitable for application to the deflection system of the display device 11 of FIG. 1. Additionally, an edge detecting arrangement is provided to generate a signal when either coordinate is large enough to deflect the beam beyond the edge of the screen. More particularly, these voltages are applied to a comparing circuit 63 where each is compared with an appropriate reference voltage indicative of the signal required to place the beam of the tube at the edge of the screen. For example, if 5 volts plus or minus is required to place the beam at the horizontal edge, right or left, and 4 volts plus or minus is required to place the beam at the top or the bottom, then $x_rc$ and $y_rc$ would be compared in absolute value with 5 volt and 4 volt references respectively and a signal would be generated when these values were exceeded. The signal can be used to take appropriate action automatically or simply as a warning device for the operator.

Although a preferred embodiment of the invention has been described in considerable detail for illustrative purposes, many modifications within the spirit of the invention will occur to those skilled in the art. It is therefore desired that the protection afforded by Letters Patent be limited only by the true scope of the appended claims. We claim:

1. A multiplying digital to analogue converter, comprising:
   means for receiving an analogue input;
   means for receiving a digital input in two's complement form;
   means for generating a first analogue output which is alternatively zero or indicative of said analogue input, depending upon the most significant bit of said digital input; and
   means for generating a second analogue output indicative of the product of said analogue input and the quantity represented by the remainder of the bits of said digital input.

2. A multiplying digital to analogue converter in accordance with claim 1 in which the means for generating the first analogue output includes a switch connected to said analogue input and operated in response to the most significant bit of said digital input.

3. A multiplying digital to analogue converter in accordance with claim 2 in which the means for generating the second analogue output includes an output line, a plurality of resistors and a plurality of switches, each of said switches being operated in response to one of the remaining bits of said digital input and each arranged to selectively connect one of said resistors between said analogue input and said output line.

4. Apparatus for deriving a unidirectional voltage the magnitude and sign of which are indicative of the function $x \cos \theta - y \sin \theta$ where $x$ and $y$ are available as unidirectional analogue voltage inputs indicative thereof and $\sin \theta$ and $\cos \theta$ are available as binary digital quantities in two's complement form indicative thereof, comprising:
   first and second multiplying digital to analogue converters, each for receiving one of said analogue voltage inputs and one of said digital quantities, each for generating a first analogue output voltage which is alternatively zero or indicative of the analogue voltage applied thereto, depending upon the most significant bit of the digital quantity applied thereto, and each for generating a second analogue output voltage indicative of the product of the applied analogue input and the quantity represented by the remainder of the bits of the applied digital quantity;
   means for applying the negative of said voltage indicative of $x$ and said quantity indicative of $\cos \theta$ to said first multiplying digital to analogue converter;
   means for applying the negative of said voltage indicative of $y$ and said quantity indicative of $\sin \theta$ to said second multiplying digital to analogue converter; and
   means for summing said first output voltage of said first converter, said second output voltage of said second converter, the negative of said second output voltage of said first converter and the negative of said first output voltage of said second converter, whereby the resulting voltage is indicative of the function $x \cos \theta - y \sin \theta$.

5. Apparatus for deriving voltages indicative of the rectangular coordinates of a point which has been rotated about the origin through an angle $\theta$ from an initial point having coordinates $x$, $y$, comprising: A. First, second, third and fourth multiplying digital to analogue converters,
   1. each including means for receiving an analogue voltage input and a digital input in two's complement form;
   2. each converter being for generating a first voltage output which is alternatively zero or indicative of the analogue input depending upon the most significant bit in said digital input; and
   3. each converter being for generating a second voltage output indicative of the product of said analogue input and the quantity represented by the remainder of the bits of said digital input;
   B. means for applying the negative of an analogue voltage indicative of $x$ to said first and third converters and applying the negative of an analogue voltage indicative of $y$ to said second and fourth converters;
   C. means for applying a digital quantity in two's complement form indicative of the cosine of $\theta$ to said first and fourth converters and for applying a digital quantity in two's complement form indicative of the sine of $\theta$ to said second and third converters,
   D. means for summing said first output of said first converter, said second output of said second converter, the negative of said second output of said first converter and the negative of said first output of said second converter, whereby a voltage indicative of the new $x$ coordinate is obtained, and
   E. means for summing said first output of said third converter, said first output of said fourth converter, the negative of said second output of said third converter and the negative of said second output of said fourth converter whereby a voltage indicative of the new $y$ coordinate is obtained.

6. A coordinate converter, comprising, first and second multiplying digital to analogue converters, each including:
   means for receiving an analogue input;
   means for receiving a digital input in two's complement form;
   means for generating a first analogue output voltage which is alternatively zero or indicative of said analogue input, depending upon the most significant bit of said digital input;
   means for generating a second analogue output voltage indicative of the product of said analogue input and the absolute value of said digital input;
   means for applying analogue inputs indicative of the negative of the abscissa and the negative of the ordinate of a point to said first and second converters, respectively;
   means for applying digital inputs indicative of the sine and cosine of an angle through which said point is to be rotated to said first and second converters, respectively; and
   means for summing;
      said first output of said first converter;
      said first output of said second converter;
      the negative of said second output of said first converter;
      the negative of said second output of said second converter; and
      whereby the sum is an analogue quantity indicative of the new ordinate of said point after rotation through said angle.